United States Patent
Kondo et al.

(10) Patent No.: US 10,167,373 B2
(45) Date of Patent: Jan. 1, 2019

(54) POLYAMIDE RESIN FOAM SHAPED PRODUCT AND METHOD OF PRODUCING POLYAMIDE RESIN FOAM SHAPED PRODUCT

(71) Applicant: ASAHI KASEI KABUSHIKI KAISHA, Tokyo (JP)

(72) Inventors: Motoki Kondo, Tokyo (JP); Yoshinori Fujino, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/556,163

(22) PCT Filed: Mar. 1, 2016

(86) PCT No.: PCT/JP2016/001109
§ 371 (c)(1),
(2) Date: Sep. 6, 2017

(87) PCT Pub. No.: WO2016/147582
PCT Pub. Date: Sep. 22, 2016

(65) Prior Publication Data
US 2018/0044497 A1 Feb. 15, 2018

(30) Foreign Application Priority Data
Mar. 18, 2015 (JP) .................................. 2015-055129

(51) Int. Cl.
*C08J 9/18* (2006.01)
*C08J 9/232* (2006.01)
*C08J 9/12* (2006.01)

(52) U.S. Cl.
CPC ............... *C08J 9/232* (2013.01); *C08J 9/122* (2013.01); *C08J 9/18* (2013.01); *C08J 2203/06* (2013.01); *C08J 2205/052* (2013.01); *C08J 2377/02* (2013.01); *C08J 2377/04* (2013.01)

(58) Field of Classification Search
CPC .............................. C08J 9/232; C08J 2377/02
See application file for complete search history.

(56) References Cited

U.S. PATENT DOCUMENTS

| 3,855,377 A | 12/1974 | Uebelhart et al. |
| 2008/0207782 A1 | 8/2008 | Jacobs et al. |
| 2011/0294910 A1* | 12/2011 | Kriha ................. C08J 9/232 521/59 |
| 2013/0038822 A1 | 2/2013 | Aono et al. |

FOREIGN PATENT DOCUMENTS

| GB | 2058802 A | 4/1981 |
| JP | S61268737 A | 11/1986 |
| JP | H07074287 A | 3/1995 |
| JP | 2001-198940 A | 7/2001 |
| JP | 2008-527133 A | 7/2008 |
| JP | 2011-105879 A | 6/2011 |
| JP | 2012040787 A | 1/2012 |
| JP | 2013-170221 A | 9/2013 |
| WO | 2011/132680 A1 | 4/2011 |
| WO | 2011134996 A1 | 11/2011 |

OTHER PUBLICATIONS

Machine translation of JP 07074287B. (Year: 1995).*
"Estimating Crystallite Size Using XRD" by Scott A Speakman. Available at http:prism.mit.edu/xray. (Year: 2016).*
S. Zhou; Y.B. Li; Y.Y. Wang; Y. Zuo; S.B. Gao; L. Zhang. "Injection-Molded Porous Hydroxyapatite/Polyamide-66 Scaffold for Bone Repair and Investigations on the Experimental Conditions" Polymer Engineering and Science 2014 pp. 1003-1013. (Year: 2014).*
Scifinder abstract of JP 07074287B. (Year: 1995).*
International Search Report from Patent Application No. PCT/JP2016/001109, dated Jun. 7, 2016.
International Preliminary Report on Patentability from Patent Application No. PCT/JP2016/001109, dated Sep. 28, 2017.
Written Opinion on the International Searching Authority from Patent Application No. PCT/JP2016/001109, dated Jul. 6, 2016.
Supplemental European Search Report from Application No. 16764415.2 dated Nov. 9, 2017.

* cited by examiner

Primary Examiner — Randy P Gulakowski
Assistant Examiner — Christina H Wales
(74) Attorney, Agent, or Firm — Greenblum & Bernstein, P.L.C.

(57) ABSTRACT

Provided are a polyamide resin foam shaped product containing a polyamide resin and having a crystallinity X of 10% to 50% and a crystallite size D of 10 nm or more as calculated based on a peak having a smallest peak width in an X-ray diffraction profile of the foam shaped product, and a method of producing this polyamide resin foam shaped product.

8 Claims, No Drawings

POLYAMIDE RESIN FOAM SHAPED PRODUCT AND METHOD OF PRODUCING POLYAMIDE RESIN FOAM SHAPED PRODUCT

TECHNICAL FIELD

This disclosure relates to a polyamide resin foam shaped product and a method of producing a polyamide resin foam shaped product.

BACKGROUND

Plastics are used in an increasing number of applications, such as for electronic devices, miscellaneous goods, automotive components, and so forth, due to their light weight compared to metals and the like. There is demand for plastic components having excellent physical properties in terms of weight-reduction performance, strength, impact resistance, and so forth in consideration of energy efficiency and the like. One known technique for responding to this demand is the technique of producing resin foam shaped products.

Examples of conventionally used plastics include general-purpose resins such as polyethylene, polystyrene, and polypropylene that excel in terms of weight-reduction performance, impact resistance, and so forth. Foam shaped products of these general-purpose resins are suitably used as cushioning materials and the like.

However, due to the poor heat resistance of these general-purpose resins, it has not been possible to use foam shaped products of these general-purpose resins for components that are required to have high heat resistance, such as automotive components.

On the other hand, engineering resins, and particularly polyamide resins, are known as plastics having high heat resistance in addition to excellent wear resistance, chemical resistance, and so forth.

Accordingly, foam shaped products of polyamide resins are considered to be of use in applications for which higher heat resistance is required.

Examples of techniques for producing resin foam shaped products include extrusion foaming, foam injection molding, and in-mold foam shaping (also referred to as bead foam shaping).

Extrusion foaming is a method in which an organic or inorganic foaming agent is injected into a molten resin using an extruder and the pressure is subsequently released at an outlet of the extruder to obtain plate, sheet, or columnar foam having a specific cross-sectional shape, and then the foam is heat processed in a mold or is cut and pasted to shape the foam into a desired shape.

Foam injection molding is a method in which an expandable resin is injection molded and foamed in a mold to obtain a foam molded product including pores.

In-mold foam shaping is a method in which expandable resin particles are loaded into a mold, are heated by steam or the like, and are foamed and simultaneously thermally fused to one another to obtain a foam molded product. In-mold foam shaping is widely used in industry due to advantages such as ease of freely setting the product shape, ease of obtaining a foam molded product with a high expansion ratio, and so forth.

Up until the present, there has been no example of production of a polyamide resin foam shaped product by bead foam shaping and no example in which it has been speculated that industrial production of such a polyamide resin foam shaped product is possible.

PTL 1, for example, discloses a technique in which polyamide resin particles and methyl alcohol are supplied into an autoclave with water solvent, the system is heated and subsequently exposed to atmospheric pressure to obtain pre-expanded particles, and then these pre-expanded particles are loaded into a mold of a shaping machine and are shaped to obtain a polyamide resin foam shaped product.

PTL 2 discloses a technique in which carbon dioxide gas is blown into polyamide resin particles in an autoclave, the resultant particles are heated to obtain pre-expanded particles, and then these pre-expanded particles are loaded into a mold of a shaping machine and are heated by hot air to obtain a polyamide resin foam product.

CITATION LIST

Patent Literature

PTL 1: JP S61-268737 A
PTL 2: JP 2011-105879 A

SUMMARY

Technical Problem

However, the foam shaped product described in PTL 1 contains methyl alcohol in the cells thereof, which is extremely harmful to the human body. Moreover, the methyl alcohol may be re-volatilized in a high-temperature environment, leading to expansion of the shaped product and deterioration of external appearance thereof. Accordingly, it is necessary to release residual methyl alcohol from the cells over a long period after shaping.

The foam shaped product described in PTL 2 is obtained by using hot air as a heating medium in shaping. However, hot air has low thermal conductivity, which makes uniform heating of the shaped product difficult. At the perimeter of a slit in the mold that serves as an inlet for the hot air during this shaping, pre-expanded particles that are heated by the hot air become thermally fused and are then continuously exposed to high-temperature air, which may cause oxidative degradation of the resin, leading to coloring and deterioration of physical properties of the resin. Moreover, heat is not sufficiently transferred at locations other than at the perimeter of the slit, and thus the temperature of the resin is not sufficiently increased at these locations. As a result, it may not be possible to obtain a shaped product that is uniformly fused because the pre-expanded particles have a low tendency to thermally fuse.

Accordingly, an objective of this disclosure is the industrial provision of a polyamide resin foam shaped product having excellent heat resistance and sound insulation.

Solution to Problem

The inventors conducted extensive and diligent research to solve the problems set forth above. Through this research, the inventors discovered that subjecting polyamide resin pre-expanded particles to a multi-stage heating process using steam has an unexpected effect of enabling strong thermal fusion between the pre-expanded particles and suppressing reduction or non-uniformity of density due to contraction or the like, while enabling a polyamide resin foam shaped product having excellent heat resistance and sound insulation to be obtained. The disclosed products and methods were completed based on this discovery.

Specifically, this disclosure provides the following.

[1] A polyamide resin foam shaped product comprising a polyamide resin, wherein the polyamide resin foam shaped product has a crystallinity X of 10% to 50% and a crystallite size D of 10 nm or more as calculated based on a peak having a smallest peak width in an X-ray diffraction profile of the polyamide resin foam shaped product.

[2] The polyamide resin foam shaped product according to the foregoing [1], having a density of 50 kg/m³ to 500 kg/m³.

[3] The polyamide resin foam shaped product according to the foregoing [1] or [2], having a closed cell ratio S of 80% or more.

[4] The polyamide resin foam shaped product according to any one of the foregoing [1] to [3], wherein the polyamide resin has a melting point of no lower than 150° C. and no higher than 270° C. as measured by differential scanning calorimetry (DSC).

[5] The polyamide resin foam shaped product according to any one of the foregoing [1] to [4], formed from polyamide resin pre-expanded particles containing the polyamide resin.

[6] The polyamide resin foam shaped product according to any one of the foregoing [1] to [5], wherein the polyamide resin includes an aliphatic polyamide resin in an amount of greater than 50 mass %.

[7] The polyamide resin foam shaped product according to any one of the foregoing [1] to [6], having a fusion rate of 60% or more.

[8] A method of producing the polyamide resin foam shaped product according to any one of the foregoing [1] to [7], comprising:

a preceding process of loading the polyamide resin pre-expanded particles into a cavity of a mold, supplying steam into the cavity for 5 seconds to 30 seconds with a temperature of no higher than a thermal fusion temperature of the polyamide resin pre-expanded particles, and pre-heating the polyamide resin pre-expanded particles; and a subsequent process of supplying steam into the cavity for 20 seconds to 120 seconds with a temperature of no lower than the thermal fusion temperature of the polyamide resin pre-expanded particles, and foaming and thermally fusing the polyamide resin pre-expanded particles to obtain a polyamide resin foam shaped product.

Advantageous Effect

This disclosure enables the industrial provision of a polyamide resin foam shaped product having excellent heat resistance and sound insulation.

The disclosed polyamide resin foam shaped product can be suitably adopted for an insulting material, automotive component (for example, an oil pan, a cover-shaped component such as an engine cover or cylinder head cover, an intake manifold, an integrated component thereof, a body structure, a duct, an electrical equipment case, or a battery case), or the like used under high-temperature conditions, such as to exploit the features of the disclosed polyamide resin foam shaped product.

DETAILED DESCRIPTION

The following provides a detailed description of a disclosed embodiment (hereinafter, referred to as the "present embodiment"). However, the following embodiment is merely an example provided for explanation. The disclosed products and methods are not limited to the following embodiment and various modifications may be made within the essential scope thereof in implementation.

(Resin Composition)

A polyamide resin foam shaped product according to the present embodiment contains a polyamide resin and may contain other freely selected components.

The polyamide resin foam shaped product according to the present embodiment has a crystallinity X of 10% to 50% and a crystallite size D of 10 nm or more as calculated based on a peak having a smallest peak width in an X-ray diffraction profile of the polyamide resin foam shaped product.

The X-ray diffraction profile of the polyamide resin foam shaped product according to the present embodiment can be obtained by a transmission method using an X-ray scattering device.

The crystallite size D of the polyamide resin foam shaped product according to the present embodiment, as calculated based on the peak having the smallest peak width in the X-ray diffraction profile of the polyamide resin foam shaped product, is 10 nm or more, preferably 11 nm or more, and more preferably 12 nm or more from a viewpoint of suppressing reduction of the heat resistance and fusion rate of the resultant foam shaped product, and is preferably 50 nm or less, and more preferably 40 nm or less from a viewpoint of suppressing reduction of the fusion rate of the resultant foam shaped product.

The crystallinity X of the polyamide resin foam shaped product according to the present embodiment, as calculated based on the X-ray diffraction profile, is 10% or more, preferably 20% or more, and more preferably 25% or more from a viewpoint of suppressing reduction of the heat resistance of the resultant foam shaped product, and is 50% or less, and preferably 45% or less from a viewpoint of suppressing reduction of the fusion rate of the resultant foam shaped product.

The crystallite size D and the crystallinity X are values determined as described below.

With respect to an X-ray diffraction profile obtained by X-ray diffraction, a Gaussian function is assumed for diffraction peaks of crystal and amorphous origin to perform peak resolving.

The crystallite size D is determined by the Scherrer equation expressed by the following formula (1).

$$D = \frac{0.9\lambda}{\sqrt{\beta^2 - b^2} \cos\theta} \quad (1)$$

In the formula, $\beta$ is the full width at half maximum (rad) of a diffraction peak of crystal origin, b is the half width at half maximum (rad) of X-ray broadening, $\lambda$ is the X-ray wavelength (units: nm), and $\theta$ is the Bragg angle (units: °) at the position of the peak.

The crystallinity X is calculated by the following formula (2).

$$X = \frac{\sum_{i=1}^{n} Aci}{Aa + \sum_{i=1}^{n} Aci} \quad (2)$$

In the formula, Aci (i=1 to n) is the area of n diffraction peaks of crystal origin obtained through peak resolving and Aa is the area of a diffraction peak of amorphous origin obtained through peak resolving.

Note that although correction for the optical system is made in the preceding formula (1), factors other than the optical system, such as the sample shape (sample thickness, etc.), also influence β. It is obviously necessary to measure X-ray diffraction under appropriate conditions, make appropriate corrections, and so forth in order that the calculated D is not dependent on the measurement conditions.

The density of the polyamide resin foam shaped product according to the present embodiment is preferably 20 k/m$^3$ or more, and more preferably 50 kg/m$^3$ or more from a viewpoint of improving external appearance of the foam shaped product by providing the foam shaped product with a suitable degree of strength such that cell walls of the foam shaped product tend not to rupture, and is preferably 800 kg/m$^3$ or less, and more preferably 500 kg/m$^3$ or less from a viewpoint of weight-reduction performance of the foam shaped product.

The closed cell ratio S of the polyamide resin foam shaped product according to the present embodiment is preferably 80% or more, and more preferably 85% or more from a viewpoint of improving the strength of the foam shaped product, and also from a viewpoint of making the in-take of water into the resin that may occur in an open-cell portion less likely to occur and making reduction in density of the foam shaped product less likely to occur.

The closed cell ratio S (%) is calculated by the following formula (3).

$$S(\%) = \{(Vx - W/\rho)/(Va - W/\rho)\} \times 100 \quad (3)$$

In the formula, Vx is the true volume (cm$^3$) of the foam shaped product, Va is the apparent volume (cm$^3$) of the foam shaped product, W is the weight (g) of the foam shaped product, and ρ is the density (g/cm$^3$) of the base material resin of the foam shaped product.

The following provides a detailed description of the polyamide resin contained in the polyamide resin foam shaped product according to the present embodiment.

Examples of the polyamide resin include polyamides, polyamide copolymers, and mixtures thereof.

Examples of polyamides that can be used include those obtained through polycondensation of a diamine and a dicarboxylic acid, such as nylon 66, nylon 610, nylon 612, nylon 46, and nylon 1212, and those obtained through lactam ring-opening polymerization, such as nylon 6 and nylon 12. Examples of polyamide copolymers that can be used include nylon 6/66, nylon 66/6, nylon 66/610, nylon 66/612, nylon 66/6T (T represents a terephthalic acid component), nylon 66/6I (1 represents an isophthalic acid component), and nylon 6T/6I. Of these examples, aliphatic polyamides are preferable, and nylon 6, nylon 66, nylon 6/66, nylon 66/6, and the like are more preferable. One of these examples may be used individually, or two or more of these examples may be used in combination.

Examples of mixtures of the preceding examples that can be used include a mixture of nylon 66 and nylon 6, a mixture of nylon 66 and nylon 612, a mixture of nylon 66 and nylon 610, a mixture of nylon 66 and nylon 6I, and a mixture of nylon 66 and nylon 6T. Of these examples, in the case of a polyamide resin that is a mixture, the polyamide resin preferably includes an aliphatic polyamide in an amount of greater than 50 mass %, and more preferably 60 mass % or more from a viewpoint of raising the crystallinity of the foam shaped product and providing the foam shaped product with sufficient heat resistance and fusion rate.

The melting point of the polyamide resin is preferably 150° C. or higher, and more preferably 180° C. or higher from a viewpoint of providing the foam shaped product with sufficient heat resistance, and is preferably 270° C. or lower, and more preferably 250° C. or lower from a viewpoint of improving the fusion rate of pre-expanded particles in a shaping process of the foam shaped product.

The melting point of the polyamide resin is a value measured in accordance with JIS K7121 by differential scanning calorimetry (DSC). Peaks appearing in measurement that indicate heat absorption are determined to be peaks that indicate melting of the resin and the melting point is determined to be the temperature corresponding to a peak indicating heat absorption that appears at a highest temperature.

The measurement device that is used may be a commercially available differential scanning calorimeter such as a DSC 7 produced by PerkinElmer Inc.

The measurement conditions may be commonly used conditions. For example, an inert gas atmosphere may be adopted and, in terms of temperature conditions, the resin may be held at a temperature higher than the melting point thereof, may be subsequently cooled rapidly to approximately room temperature at 20° C./min, and may then be heated to higher than the melting point thereof at 20° C./min.

High-reactivity functional groups at ends of the polyamide resin (i.e., amino groups and carboxyl groups) may be converted to low-reactivity functional groups through addition of an end-capping agent in synthesis of the polyamide resin (i.e., through end-capping of the polyamide resin).

In a situation in which an end-capping agent is added, the timing of addition may, for example, be at the time of charging of raw materials, the start of polymerization, a mid- to late-period of polymerization, or the end of polymerization.

No specific limitations are placed on the end-capping agent other than being a monofunctional compound capable of reacting with an amino group or a carboxyl group of the polyamide resin. Examples of end-capping agents that can be used include monocarboxylic acids, monoamines, acid anhydrides, monoisocyanates, monoacid halides, monoesters, and monoalcohols. One of these examples may be used individually, or two or more of these examples may be used in combination.

The amine value and the acid value of the polyamide resin may each be 0 equivalents/1×10$^6$ g or more, and are preferably 200 equivalents/1×10$^6$ g or less, and more preferably 100 equivalents/1×10$^6$ g or less from a viewpoint of inhibiting gelation or degradation of the polyamide resin during melt retention and from a viewpoint of inhibiting problems such as coloration and hydrolysis in the environment of use of the resin.

Examples of components other than the polyamide resin that may be contained in the polyamide resin foam shaped product according to the present embodiment to the extent that the objectives described herein are not impeded include stabilizers, impact modifiers, flame retardants, lubricants, pigments, dyes, weather resistance modifiers, antistatic agents, impact resistance modifiers, crystal nucleating agents, glass beads, inorganic fillers, crosslinking agents, nucleating agents such as talc, and other thermoplastic resins, in the polyamide resin foam shaped product according to the present embodiment, the content of such other components per 100 parts by mass of the polyamide resin may be 15 parts by mass or less, is preferably 6 parts by mass or less, and is more preferably 3 parts by mass or less.

Examples of stabilizers that can be used include, but are not specifically limited to, organic antioxidants and heat stabilizers such as hindered phenol antioxidants, sulfuric antioxidants, phosphoric antioxidants, phosphite compounds, and thioether compounds; light stabilizers and ultraviolet absorbers such as those based on hindered amines, benzophenone, and imidazole; and metal deactivators. One of these examples may be used individually, or two or more of these examples may be used in combination.

A copper compound is preferably used as a heat stabilizer from a viewpoint of effectively preventing long-term heat aging in a high-temperature environment of 120° C. or higher. Moreover, a combination of the copper compound with an alkali metal halide compound is also preferable. Examples of alkali metal halide compounds that can be used include lithium chloride, lithium bromide, lithium iodide, sodium fluoride, sodium chloride, sodium bromide, sodium iodide, potassium fluoride, potassium chloride, potassium bromide, and potassium iodide. One of these examples may be used individually, or two or more of these examples may be used in combination.

The flame retardant is preferably, but not specifically limited to, a combination of a halogen-containing flame retardant and an antimony compound.

Examples of preferable halogen-containing flame retardants include brominated polystyrene, brominated polyphenylene ether, brominated bisphenol epoxy resin, brominated styrene-maleic anhydride copolymer, brominated epoxy resin, brominated phenoxy resin, decabromodiphenyl ether, decabromobiphenyl, brominated polycarbonate, perchlorocyclopentadecane, and brominated crosslinked aromatic polymers. Examples of preferable antimony compounds include antimony trioxide, antimony pentoxide, and sodium antimonate.

A combination of dibromopolystyrene and antimony trioxide is preferable as the flame retardant from a viewpoint of heat stability.

Non-halogen-containing flame retardants may also be used as flame retardants, specific examples of which include melamine cyanurate, red phosphorus, phosphinic acid metal salts, and nitrogen containing phosphoric acid compounds. In particular, a combination of a phosphinic acid metal salt and a nitrogen-containing phosphoric acid compound (for example, inclusive of a reaction product or mixture of polyphosphoric acid and melamine or a condensation product of melamine (melam, melon, etc.)) is preferable.

A compound, polymer, or the like including a substituent (hereinafter, to also referred to as a reactive substituent) that reacts with an amino group or carboxyl group of the polyamide resin contained in the polyamide resin foam shaped product according to the present embodiment may be used to increase the degree of crosslinking of the resin by forming a crosslinked structure via the substituent in molecules of the resin.

Examples of the reactive substituent include functional groups such as a glycidyl group, a carboxyl group, a carboxylic acid metal salt, an ester group, a hydroxyl group, an amino group, and a carbodiimide group. In particular, a glycidyl group or a carbodiimide group is preferable from a viewpoint of rate of reaction.

One of these examples may be used individually, or two or more of these examples may be used in combination. Moreover, the compound, polymer, or the like may include more than one type of functional group in individual molecules thereof.

The reactive substituent is preferably introduced into the resin in an amount that does not lead to gelation of the resin or the like due to crosslinking.

The polyamide resin is not limited to a specific form and may, for example, be in the form of beads, pellets, spheres, or a pulverized product of undefined shape. The size of the polyamide resin in such forms is preferably 0.2 mm to 3 mm from a viewpoint of obtaining appropriately sized pre-expanded particles after foaming, facilitating handling of the pre-expanded particles, and enabling denser loading in shaping.

The polyamide resin foam shaped product according to the present embodiment is formed from polyamide resin pre-expanded particles according to the present embodiment that contain the polyamide resin set forth above.

The method by which the polyamide resin pre-expanded particles according to the present embodiment are produced from the polyamide resin set forth above and the method by which the polyamide resin foam shaped product according to the present embodiment is produced from the polyamide resin pre-expanded particles according to the present embodiment are explained further below.

The rate of dimensional change under heating of the polyamide resin foam shaped product according to the present embodiment is preferably 1.5% or less, and more preferably 1.0% or less.

The rate of dimensional change is a value measured in accordance with procedure B of dimensional stability evaluation in JIS K6767.

The bending strength of the polyamide resin foam shaped product according to the present embodiment is preferably 2.0 MPa or more, and more preferably 3.0 MPa or more, and is preferably 15 MPa or less, and more preferably 10 MPa or less.

The bending strength is a value measured in accordance with JIS K7171.

The fusion rate of the poly-amide resin foam shaped product according to the present embodiment is preferably 60% or more, more preferably 70% or more, and most preferably 80% or more from a viewpoint of increasing the breaking strength when stress such as bending strain is applied to the foam shaped product and from a viewpoint of inhibiting detachment of pre-expanded particles from the foam shaped product when the shaped product is cut.

The fusion rate is measured by a method described in the subsequent EXAMPLES section.

(Method of Producing Polyamide Resin Foam Shaped Product)

The following first describes a method of producing the polyamide resin pre-expanded particles according to the present embodiment that are used in production of the poly-amide resin foam shaped product according to the present embodiment. In the present specification, the term "pre-expanded particles" refers to expandable particles (beads, etc.) that have not been subjected to a final stage of foaming.

The polyamide resin pre-expanded particles according to the present embodiment can be obtained by causing a foaming agent to become contained (impregnated) in the polyamide resin set forth above and then performing foaming.

The method by which the foaming agent becomes contained (impregnated) in the polyamide resin is not specifically limited and may be a generally used method.

Examples of methods that can be used include a method in which an aqueous medium is used in a suspension of water or the like (suspension impregnation), a method in which a thermal decomposition-type foaming agent such as sodium bicarbonate is used (foaming agent decomposition), a method in which a gas is set as an atmosphere of equal or higher pressure than the critical pressure and is brought into contact with the base material resin in a liquid phase state (liquid phase impregnation), and a method in which a gas is set as an atmosphere of lower pressure than the critical pressure and is brought into contact with the base material resin in a gas phase state (gas phase impregnation).

Of the above methods, gas phase impregnation is particularly preferable.

Compared to suspension impregnation carried out under high-temperature conditions, gas phase impregnation makes it easier to obtain a high foaming agent content because the gas has a higher solubility in the resin. Consequently, it is easier to achieve a high expansion ratio and uniform cell size in the resin when gas phase impregnation is adopted.

The foaming agent decomposition method is inconvenient as it is carried out under high-temperature conditions in the same way as suspension impregnation. Moreover, not all the thermal decomposition-type foaming agent that is added in the foaming agent decomposition method is converted to gas, and thus the amount of gas that is generated tends to be relatively small. Accordingly, gas phase impregnation is advantageous in terms that a high foaming agent content can be easily achieved.

Moreover, compared to liquid phase impregnation, gas phase impregnation allows the use of more compact equipment (pressure apparatus, cooling apparatus, etc.) and facilitates equipment cost reduction.

Although the conditions of gas phase impregnation are not specifically limited, an ambient pressure of 0.5 MPa to 6.0 MPa and an ambient temperature of 5° C. to 30° C. are preferable from a viewpoint of causing the gas to dissolve in the resin more efficiently.

The foaming agent used in production of the polyamide resin pre-expanded particles according to the present embodiment is not specifically limited and may, for example, be air or a compound that can be set in a gaseous state.

Examples of compounds settable in a gaseous state that may be used include inorganic compounds such as carbon dioxide, nitrogen, oxygen, hydrogen, argon, helium, and neon; fluorocarbons such as trichlorofluoromethane (R11), dichlorodifluoromethane (R12), chlorodifluoromethane (R22), tetrachlorodifluoroethane (R112), dichlorofluoroethane (R141b), chlorodifluoroethane (R142b), difluoroethane (R152a), HFC-245fa, HFC-236ea, HFC-245ca, and HFC-225ca; hydrofluoroolefins such as HFO-1234y and HFO-1234ze(E); saturated hydrocarbons such propane, n-butane, i-butane, n-pentane, i-pentane, and neopentane; ethers such as dimethyl ether, diethyl ether, methyl ethyl ether, isopropyl ether, n-butyl ether, diisopropyl ether, furan, furfural, 2-methylfuran tetrahydrofuran, and tetrahydropyran; chlorinated hydrocarbons such as methyl chloride and ethyl chloride; and alcohols such as methanol and ethanol.

The air or compound that can be set in a gaseous state may be a single type used individually or a combination of two or more types.

The foaming agent is preferably a foaming agent that has low environmental impact and is not flammable or combustion-supporting, is more preferably an inorganic compound that is not flammable from a viewpoint of safety during handling, and is particularly preferably carbon dioxide gas from a viewpoint of solubility in resin and ease of handling.

No specific limitations are placed on the method by which the polyamide resin containing (impregnated with) the foaming agent is foamed. Examples of methods that can be used include a method in which the pre-expanded particles are suddenly transferred from a high-pressure atmosphere to a low-pressure atmosphere such that a gas of the foaming agent dissolved in the pre-expanded particles expands and causes foaming to occur and a method in which heating is performed using pressurized steam or the like to expand gas in the pre-expanded particles and cause foaming to occur. In particular, the latter method of heating and foaming is preferable due to a benefit of enabling uniform cell size within the shaped product that is produced and a benefit of facilitating production of a shaped product having a low expansion ratio through control of the expansion ratio.

In foaming of the pre-expanded particles to obtain a desired expansion ratio, foaming may be performed in a single stage, or multi-stage foaming including secondary foaming, tertiary foaming, and so forth may be performed. In a situation in which multi-stage foaming is performed, it is easy to produce pre-expanded particles having a high expansion ratio. The pre-expanded particles used in shaping are preferably pre-expanded particles that have been subjected to foaming up until tertiary foaming from a viewpoint of reducing the amount of resin that is used per unit volume.

In particular, in a situation in which multi-stage foaming is performed, it is preferable that at each stage, the pre-expanded particles are pressure treated with gas prior to foaming. Although no specific limitations are placed on the gas that is used in the pressure treatment other than being a gas that is inert with respect to the polyamide resin, an inorganic gas or hydrofluoroolefin having high safety as a gas and low global warming potential as a gas is preferable. Examples of inorganic gases that can be used include air, carbon dioxide gas, nitrogen gas, oxygen gas, ammonia gas, hydrogen gas, argon gas, helium gas, and neon gas. Examples of hydrofluoroolefins that can be used include HFO-1234y and HFO-1234ze(E). In particular, air and carbon dioxide gas are preferable in terms of ease of handling and cost. The pressure treatment method may be, but is not specifically limited to, a method in which the pre-expanded particles are loaded into a pressure tank and the gas is supplied into the tank.

The polyamide resin foam shaped product according to the present embodiment can be obtained through shaping of the polyamide resin pre-expanded particles according to the present embodiment set forth above.

The method by which the polyamide resin pre-expanded particles are shaped is not specifically limited and may, for example, be a method in which the pre-expanded particles are loaded into the cavity of a mold for shaping and are heated to cause foaming and simultaneous thermal fusion of the pre-expanded particles to one another, and then cooling is performed to solidify and shape the resultant product. The method by which the pre-expanded particles are loaded is not specifically limited and examples thereof include a cracking method in which the pre-expanded particles are loaded with the mold in a slightly opened state, a compression method in which pressure compressed pre-expanded particles are loaded with the mold in a closed state, and a compression cracking method in which the above cracking method is adopted after loading pressure compressed pre-expanded particles into the mold.

Herein, it is preferable that the pre-expanded particles are pressure treated with a gas prior to being loaded into the cavity of the mold for shaping from a viewpoint of applying uniform gas pressure in the cells of the pre-expanded particles and obtaining a uniform cell size within the particles. Although no specific limitations are placed on the gas used in the pressure treatment, an inorganic gas is preferable from a viewpoint of flame retardance, heat resistance, and dimensional stability. The inorganic gas and method of pressure treatment are the same as in a situation in which pre-expanded particles are pressure treated with a gas prior to foaming in the previously described method of foaming the polyamide resin.

The heating medium used in shaping of the polyamide resin pre-expanded particles may be a general-purpose heating medium, is preferably saturated steam or superheated steam from a viewpoint of inhibiting oxidative degradation of the foam shaped product, and is more preferably saturated steam from a viewpoint of enabling uniform heating with respect to the foam shaped product.

More specifically, the method of producing the polyamide resin foam shaped product according to the present embodiment includes a preceding process of loading the polyamide resin pre-expanded particles into a cavity of a mold, supplying steam into the cavity for 5 seconds to 30 seconds with a temperature of no higher than the thermal fusion temperature of the polyamide resin pre-expanded particles, and pre-heating the polyamide resin pre-expanded particles; and a subsequent process of supplying steam into the cavity for 20 seconds to 120 seconds with a temperature of no lower than the thermal fusion temperature of the polyamide resin pre-expanded particles, and foaming and thermally fusing the polyamide resin pre-expanded particles to obtain a polyamide resin foam shaped product.

In this manner, the polyamide resin foam shaped product according to the present embodiment is obtained through two-stage heating of the polyamide resin pre-expanded particles.

According this method, the polyamide resin pre-expanded particles are pre-heated in a first stage through steam with a temperature of no higher than the thermal fusion temperature of the pre-expanded particles, which enables a more uniform temperature distribution to be obtained among the entire collection of pre-expanded particles. Accordingly, this pre-heating in the first stage enables more uniform foaming of the pre-expanded particles in a second stage when the pre-expanded particles are heated through steam with a temperature of no lower the thermal fusion temperature, and facilitates shaping of the pre-expanded particles to form a foam shaped product.

Moreover, through this method, it is possible to increase the resin crystallite size and raise the crystallinity in the resultant polyamide resin foam shaped product, and to obtain a polyamide resin foam shaped product having excellent heat resistance.

The temperature in heating of the polyamide resin pre-expanded particles is preferably close to the thermal fusion temperature (Tf) of the polyamide resin pre-expanded particles as previously described.

Note that the thermal fusion temperature is the temperature at which the pre-expanded particles fuse to one another upon heating in saturated steam.

The thermal fusion temperature is measured by a method described in the subsequent EXAMPLES section.

The heating temperature in the first stage is preferably a lower temperature than Tf (° C.), is preferably Tf−20° C. or higher, and more preferably Tf−15° C. or higher, and is preferably Tf−2° C. or lower, and more preferably Tf−5° C. or lower.

The heating time in the first stage is preferably 2 seconds or more, and more preferably 3 seconds or more, and is preferably 20 seconds or less, and more preferably 15 seconds or less.

The heating temperature in the second stage is a higher temperature than Tf (° C.), and is preferably Tf+15° C. or lower, more preferably Tf+10° C. or lower, and particularly preferably Tf+5° C. or lower.

The heating time in the second stage is preferably 10 seconds or more, and more preferably 15 seconds or more, and is preferably 60 seconds or less, and more preferably 45 seconds or less.

By setting the heating temperature and time in the first and second stages within any of the ranges set forth above, sufficient thermal fusion between the polyamide resin pre-expanded particles can be achieved and a resin foam shaped product can be obtained in which resin crystallization is promoted.

EXAMPLES

The disclosed products and methods are described in more detail through the following examples and comparative examples, but are not limited thereto.

The following measurement methods (A) to (E) were used to measure the physical properties of polyamide resins, polyamide resin pre-expanded particles, and polyamide resin foam shaped products in the subsequently described examples and comparative examples.

(A) Crystallite Size and Crystallinity

X-ray diffraction (XRD) measurement of an obtained polyamide resin foam shaped product was carried out by a transmission method using an X-ray scattering device (product name: Nano-Viewer; produced by Rigaku Corporation). The measurement conditions were a 0.4 mm φ first slit, a 0.2 mm φ second slit, an X-ray wavelength of 0.154 nm, and a camera length of 78.8 mm. An imaging plate (IP) was used as a detector. The sample was a slice of the foam shaped product having a sample thickness of approximately 0.2 mm. A two-dimensional X-ray diffraction pattern obtained through the IP was converted to one dimension by circular averaging. Blank cell scattering correction was also carried out.

Software (product name: Igor Pro Version 6.3.2.3; produced by WaveMetrics Inc.) was used with respect to the one-dimensional X-ray diffraction profile obtained in this manner to assume a Gaussian function for the shape of peaks and perform peak resolving of diffraction peaks of crystal and amorphous origin.

(A-1) Crystallite Size

Among peaks obtained through this peak resolving, the full width at half height β (rad) of a peak having a smallest peak width was calculated, and the full width at half height β was used to calculate the crystallite size D of the foam shaped product using the previously shown formula (1).

(A-2) Crystallinity

The area of each peak obtained through the peak resolving was calculated and the calculated areas were used to calculate the crystallinity X of the foam shaped product by the previously shown formula (2).

(B) Density

The weight W (kg) of an obtained polyamide resin foam shaped product was measured and then the apparent volume Va (m$^3$) of the foam shaped product was measured by a water immersion method. A value W/Va (kg/m$^3$) calculated by dividing the weight W by the apparent volume Va was determined to be the density of the foam shaped product.

(C) Closed Cell Ratio

The true volume (Vx) of a foam shaped product for which the apparent volume Va had been measured as previously described in (B) was measured using an air pyrometer (produced by Beckman Coulter, Inc.). The closed cell ratio S (%) was then calculated by the previously shown formula (3).

(D) Melting Point

The melting point of a polyamide resin was measured in accordance with JIS K7121 using a differential scanning calorimeter (product name: DSC 7; produced by PerkinElmer Inc.). A sample of 8 mg was precisely weighed out and used for measurement. The measurement was performed in a nitrogen atmosphere and, in terms of temperature conditions, the sample was held at 300° C. for 5 minutes, was then cooled to 50° C. at a cooling rate of 20° C./min, and was subsequently heated from 50° C. to 300° C. at a heating rate of 20° C./min.

Peaks indicating heat absorption that appeared in measurement were determined to be peaks indicating melting of the resin and the melting point of the resin was determined to be the temperature (° C.) corresponding to a peak indicating heat absorption that appeared at a highest temperature.

(E) Thermal Fusion Temperature

Obtained polyamide resin pre-expanded particles were placed in a state in which the pressure inside cells thereof was atmospheric pressure and in which a foaming agent such as a hydrocarbon was not contained therein. Next, 10 g of the pre-expanded particles were placed in a metal mesh container such that the pre-expanded particles were in contact with one another and the pre-expanded particles were then heated for 30 seconds through saturated steam with a certain temperature. The thermal fusion temperature of the pre-expanded particles was determined to be the lowest temperature (° C.) among temperatures at which a total of 80% or more of the pre-expanded particles had fused to one another after heating.

The following describes evaluation methods (1) to (5) for polyamide resin foam shaped products in the subsequently described examples and comparative examples.

(1) Heat Resistance Evaluation

The heat resistance of polyamide resin foam shaped products in the subsequently described examples and comparative examples was evaluated by evaluating the rate of dimensional change under heating and change in external appearance after heating.

(1-1) Rate of Dimensional Change

After shaping, a foam shaped product was dried for 24 hours using a 60° C. dryer to remove moisture contained in the shaped product. The rate of dimensional change (%) of the foam shaped product was then evaluated by preparing a specimen and carrying out a heating test in accordance with procedure B of dimensional stability evaluation in JIS K6767. A temperature of 180° C. was adopted in the case of a polyamide resin foam shaped product for which the base material resin was polyamide 6 and a temperature of 160° C. was adopted in the case of a polyamide resin foam shaped product for which the base material resin was polyamide 666.

In terms of evaluation criteria, a smaller rate of dimensional change was judged to indicate better foam shaped product heat resistance.

(1-2) Change in External Appearance

The change in external appearance of the specimen after the heating test previously described in (1-1) was evaluated by eye. The evaluation criteria were as follows.

Good: No cracking, contraction, or expansion of specimen

Satisfactory: Slight cracking, contraction, and/or expansion of specimen observed at a level not problematic for use Poor: Cracking, contraction, and/or expansion of specimen observed at a level problematic for use (2) Bending Strength After shaping, a foam shaped product was dried for 24 hours using a 60° C. dryer to remove moisture contained in the shaped product. The bending strength (MPa) of the foam shaped product was then measured in accordance with JIS K7171.

(3) Fusion Rate

A cutter knife was used to make an incision line of 5 mm in depth into the surface of a foam shaped product having a plate shape of 300 mm in length, 300 mm in width, and 20 mm in thickness such as to divide the foam shaped product in half lengthwise, and the foam shaped product was then split along this line. With regards to pre-expanded particles appearing at the split surface, the number (a) of pre-expanded particles for which breaking occurred within the particle (i.e., pre-expanded particles broken by the split surface) and the number (b) of pre-expanded particles for which breaking occurred along the interface between pre-expanded particles (i.e., pre-expanded particles for which the interface between pre-expanded particles became the split surface) were counted, and the fusion rate (%) was calculated by the following formula (4).

$$\text{Fusion rate}(\%) = \{a/(a+b)\} \times 100 \tag{4}$$

(4) External Appearance

The external appearance of the surface of the foam shaped product straight after shaping was evaluated by eye. The evaluation criteria were as follows.

Good: Smooth, no gaps between pre-expanded particles, and no occurrence of shrink warping or the like Satisfactory: Slight shrink warping or the like observed or small gaps between pre-expanded particles observed at a level not problematic for use Poor: Shrink warping or the like observed or large gaps between pre-expanded particles observed at a level not suitable for practical use, or shaping not possible (5) Sound Insulation Random noise emitted from a sound generator in a sound box was measured using a 2-channel FET analyzer 2034 (produced by Bruel & Kjaer) and a sound intensity probe 3548 (produced by Bruel & Kjaer), both in the presence and absence of a foam shaped product obtained after shaping. More specifically, sound intensity outside of the sound box was measured for both a case in which an opening of the sound box was in an open state and a case in which a shaped piece of the foam shaped product having a size of 150 mm in width and 100 mm in length and a weight of 50 g was set at the opening of the sound box. The sound transmission loss (dB) due to the shaped piece of the foam shaped product was calculated by subtracting the intensity measured with the foam shaped product present from the intensity measured without the foam shaped product. The evaluation criteria were as follows.

Good: Sound transmission loss for 50 Hz noise of 30 dB or more

Poor: Sound transmission loss for 50 Hz noise of less than 30 dB

Example 1

A pelletized base material resin was prepared by using an extruder to melt-knead 100 parts by mass of nylon 6 (product name: UBE Nylon 1022B; produced by Ube Industries, Ltd.) as a polyamide resin and 0.8 parts by mass of talc as a nucleating agent under heated conditions, and extrude the melt-kneaded product in the form of strands that were then cooled by water in a cold-water tank and cut to obtain pellets.

The base material resin was then impregnated with carbon dioxide gas as a foaming agent by a method described in the examples of JP 2011-105879 A. The base material resin containing the carbon dioxide gas was heated to cause foaming and thereby obtain pre-expanded particles having a density of 300 kg/m$^3$.

The resultant pre-expanded particles were pressure treated by sealing the pre-expanded particles in an autoclave, introducing compressed air into the autoclave over 1 hour until the pressure inside the autoclave reached 0.5 MPa, and then maintaining the pressure at 0.5 MPa for 24 hours.

The pre-expanded particles subjected to pressure treatment were then loaded into the cavity (cavity dimensions: 300 mm in length, 300 mm in width, 20 mm in height) of an in-mold shaping mold and the mold was clamped. The mold was installed in an in-mold foam shaping machine.

Thereafter, the pre-expanded particles were shaped by supplying 135° C. saturated steam into the cavity for 10 seconds (first stage heating), and subsequently supplying 144° C. saturated steam into the cavity for 30 seconds (second stage heating) to cause foaming and thermal fusion of the pre-expanded particles.

Cooling water was supplied into the cavity of the mold to cool the resultant shaped product. Thereafter, the mold was opened and the foam shaped product was removed.

The results of evaluation of the polyamide resin foam shaped product in Example 1 are shown in Table 1.

Example 2

A foam shaped product was obtained in the same way as in Example 1 with the exception that after pre-expanded particles having a density of 300 kg/m$^3$ were obtained in the same way as in Example 1, the pre-expanded particles were pressure treated by sealing the pre-expanded particles in an autoclave, introducing compressed air into the autoclave over 1 hour until the pressure inside the autoclave reached 0.3 MPa, and then maintaining the pressure at 0.3 MPa for 24 hours, and the pre-expanded particles subjected to pressure treatment were further foamed to a density of 150 kg/m$^3$ by further heating at 230° C. prior to being loaded into the mold.

The results of evaluation of the polyamide resin foam shaped product in Example 2 are shown in Table 1.

Example 3

A foam shaped product was obtained in the same way as in Example 1 with the exception that after pre-expanded particles having a density of 150 kg/m$^3$ were obtained in the same way as in Example 2, the pre-expanded particles were pressure treated by sealing the pre-expanded particles in an autoclave, introducing compressed air into the autoclave over 1 hour until the pressure inside the autoclave reached 0.15 MPa, and then maintaining the pressure at 0.15 MPa for 24 hours, and the pre-expanded particles subjected to pressure treatment were further foamed to a density of 50 kg/m$^3$ by further heating at 230° C. prior to being loaded into the mold.

The results of evaluation of the polyamide resin foam shaped product in Example 3 are shown in Table 1.

Example 4

A foam shaped product was obtained in the same way as in Example 1 with the exception that in the second stage heating during shaping of the pre-expanded particles, 155° C. saturated steam was supplied into the cavity for 30 seconds instead of supplying 144° C. saturated steam for 30 seconds.

The results of evaluation of the polyamide resin foam shaped product in Example 4 are shown in Table 1.

Example 5

A foam shaped product was obtained in the same way as in Example 1 with the exception that foaming was performed such that the pre-expanded particles had a density of 500 kg/m$^3$.

The results of evaluation of the polyamide resin foam shaped product in Example 5 are shown in Table 1.

Example 6

A pelletized base material resin was prepared by using an extruder to melt-knead 100 parts by mass of nylon 666 (nylon 66/6) (product name: Novamid 2430A; produced by DSM) as a polyamide resin and 0.8 parts by mass of talc as a nucleating agent under heated conditions, and extrude the melt-kneaded product in the form of strands that were then cooled by water in a cold-water tank and cut to obtain pellets.

The base material resin was then impregnated with carbon dioxide gas as a foaming agent by the method described in the examples of JP 2011-105879 A. The base material resin containing the carbon dioxide gas was heated to cause foaming and thereby obtain pre-expanded particles having a density of 300 kg/m$^3$.

The resultant pre-expanded particles were pressure treated by sealing the pre-expanded particles in an autoclave, introducing compressed air into the autoclave over 1 hour until the pressure inside the autoclave reached 0.4 MPa, and then maintaining the pressure at 0.4 MPa for 24 hours.

The pre-expanded particles subjected to pressure treatment were loaded into the cavity (cavity dimensions: 300 mm in length, 300 mm in width, 20 mm in height) of an in-mold shaping mold and the mold was clamped. The mold was installed in an in-mold foam shaping machine.

Thereafter, the pre-expanded particles were shaped by supplying 105° C. saturated steam into the cavity for 10 seconds, and subsequently supplying 116° C. saturated steam into the cavity for 30 seconds to cause foaming and thermal fusion of the pre-expanded particles.

Cooling water was supplied into the cavity of the mold to cool the resultant shaped product. Thereafter, the mold was opened and the foam shaped product was removed.

The results of evaluation of the polyamide resin foam shaped product in Example 6 are shown in Table 1.

Example 7

A foam shaped product was obtained in the same way as in Example 6 with the exception that after pre-expanded particles having a density of 300 kg/m$^3$ were obtained in the same way as in Example 6, the pre-expanded particles were pressure treated by sealing the pre-expanded particles in an autoclave, introducing compressed air into the autoclave over 1 hour until the pressure inside the autoclave reached 0.3 MPa, and then maintaining the pressure at 0.3 MPa for 24 hours, and the pre-expanded particles subjected to pressure treatment were further foamed to a density of 150 kg/m$^3$ by further heating at 200° C. prior to being loaded into the mold.

The results of evaluation of the polyamide resin foam shaped product in Example 7 are shown in Table 1.

Example 8

A foam shaped product was obtained in the same way as in Example 6 with the exception that an in-mold shaping mold was used such that the resultant foam shaped product had dimensions of 150 mm in width and 100 mm in length and a weight of 50 g.

The results of evaluation of the polyamide resin foam shaped product in Example 8 are shown in Table 1.

Example 9

A foam shaped product was obtained in the same way as in Example 2 with the exception that 50 parts by mass of nylon 6 (product name: UBE Nylon 1022B; produced by Ube Industries, Ltd.) and 50 parts by mass of nylon 6I/6T (product name: Grivory G16; produced by EMS) were used as the polyamide resin.

The results of evaluation of the polyamide resin foam shaped product in Example 9 are shown in Table 1.

Example 10

A foam shaped product was obtained in the same way as in Example 1 with the exception that 0.3 parts by mass of a hindered phenol antioxidant (product name: Irganox 1098; produced by BASF) was further added as a heat stabilizer in melt-kneading.

The results of evaluation of the polyamide resin foam shaped product in Example 10 are shown in Table 1. Note that almost no yellowing of the foam product occurred even when the foam product was left in a 180° C. oven for 100 hours.

Comparative Example 1

A foam shaped product was obtained in the same way as in Example 1 with the exception that heating was not performed in the second stage of shaping of the pre-expanded particles.

The results of evaluation of the polyamide resin foam shaped product in Comparative Example 1 are shown in Table 1.

Comparative Example 2

A foam shaped product was obtained in the same way as in Example 1 with the exception that the base resin material was foamed using methanol as a foaming agent by a method described in the examples of JP S61-268737 A to obtain pre-expanded particles having a density of 300 kg/m$^3$, and the resultant pre-expanded particles were not pressure treated and were dried for 24 hours using a 60° C. dryer prior to being loaded into the mold.

The results of evaluation of the polyamide resin foam shaped product in Comparative Example 2 are shown in Table 1.

Comparative Example 3

A foam shaped product was obtained in the same way as in Example 1 with the exception that pre-expanded particles subjected to pressure treatment in the same way as in Example 1 were loaded into the cavity of an in-mold shaping mold, and then 240° C. hot air was supplied alternately from a male mold and a female mold of the mold, one side at a time, for 240 seconds.

The results of evaluation of the polyamide resin foam shaped product in Comparative Example 3 are shown in Table 1.

Comparative Example 4

A polyamide resin plate having dimensions of 150 mm in width and 100 mm in length and a weight of 50 g was prepared through hot-pressing of polyamide 666 resin.

The results of evaluation of the polyamide resin plate in Comparative Example 4 are shown in Table 1.

TABLE 1

| | | | | Example 1 | Example 2 | Example 3 | Example 4 | Example 5 | Example 6 | Example 7 |
|---|---|---|---|---|---|---|---|---|---|---|
| Foam shaped product | (A-1) Crystallite size D | | mm | 10 | 10 | 10 | 10 | 10 | 12 | 12 |
| | (A-2) Crystallinity X | | % | 36 | 37 | 36 | 36 | 37 | 29 | 30 |
| | (B) Density | | kg/m$^3$ | 200 | 100 | 50 | 200 | 500 | 200 | 100 |
| | (C) Closed cell ratio S | | % | 87 | 85 | 80 | 43 | 85 | 90 | 86 |
| In-mold foam shaping | Heating medium | Type | | Steam | Steam | Steam | Steam | Steam | Steam | Steam |
| | First stage heating | Temperature | ° C. | 135 | 135 | 135 | 135 | 135 | 105 | 105 |
| | | Time | s | 10 | 10 | 10 | 10 | 10 | 10 | 10 |
| | Second stage heating | Temperature | ° C. | 144 | 144 | 144 | 155 | 144 | 116 | 116 |
| | | Time | s | 30 | 30 | 30 | 30 | 30 | 30 | 30 |
| Pre-expanded particles | Polyamide resin | Type | | Polyamide 6 | Polyamide 6 | Polyamide 6 | Polyamide 6 | Polyamide 6 | Polyamide 666 | Polyamide 666 |
| | | (D) Melting point | ° C. | 225 | 225 | 225 | 225 | 225 | 195 | 195 |
| | | Amount | Parts by mass | 100 | 100 | 100 | 100 | 100 | 100 | 100 |
| | Nucleating agent | Type | | Talc | Talc | Talc | Talc | Talc | Talc | — |
| | | Amount | Parts by mass | 0.8 | 0.8 | 0.8 | 0.8 | 0.8 | 0.8 | 0.8 |
| | Stabilizer | Type | | — | — | — | — | — | — | — |
| | | Amount | Parts by mass | — | — | — | — | — | — | — |
| | Foaming agent | Type | | Air | Air | Air | Air | Air | Air | Air |
| | (E) Thermal fusion temperature | | ° C. | 140 | 140 | 140 | 140 | 140 | 113 | 113 |

TABLE 1-continued

| | | | | | | | | | | |
|---|---|---|---|---|---|---|---|---|---|---|
| Evaluation of foam shaped product | (1) Heat resistance evaluation (160° C.) | (1-1) Rate of dimensional change | % | — | — | — | — | — | −0.6 | −0.7 |
| | | (1-2) Change in external appearance | — | — | — | — | — | — | Good | Good |
| | (1) Heat resistance evaluation (180° C.) | (1-1) Rate of dimensional change | % | 0.7 | 0.7 | 1.5 | 0.5 | 0.7 | — | — |
| | | (1-2) Change in external appearance | — | Good | Good | Satisfactory | Good | Good | — | — |
| | (2) Bending strength | | MPa | 3.6 | 1.9 | 0.7 | 3 | 12 | 2.5 | 1.4 |
| | (3) Fusion rate | | % | 87 | 88 | 82 | 91 | 81 | 93 | 91 |
| | (4) External appearance | | — | Good | Good | Satisfactory | Satisfactory | Good | Good | Good |
| | (5) Sound insulation evaluation | | — | Not measured | Not measured | Not measured | Not measured | Not measured | Not measured | Not measured |

| | | | | Example 8 | Example 9 | Example 10 | Comparative Example 1 | Comparative Example 2 | Comparative Example 3 | Comparative Example 4 |
|---|---|---|---|---|---|---|---|---|---|---|
| Foam shaped product | (A-1) Crystallite size D | | mm | 12 | 10 | 10 | 8 | 6 | 8 | — |
| | (A-2) Crystallinity X | | % | 29 | 12 | 36 | 19 | 15 | 15 | — |
| | (B) Density | | kg/m³ | 200 | 100 | 200 | 200 | 350 | 200 | 1130 |
| | (C) Closed cell ratio S | | % | 90 | 82 | 87 | 90 | 60 | 90 | — |
| In-mold foam shaping | Heating medium | Type | | Steam | Steam | Steam | Steam | Steam | Hot air | — |
| | First stage heating | Temperature | °C. | 105 | 135 | 135 | 144 | 135 | 240 | — |
| | | Time | s | 10 | 10 | 10 | 30 | 10 | 240 | — |
| | Second stage heating | Temperature | °C. | 116 | 144 | 144 | — | 144 | — | — |
| | | Time | s | 30 | 30 | 30 | — | 30 | — | — |
| Pre-expanded particles | Polyamide resin | Type | | Polyamide 666 | Polyamide 6 | Polyamide 6/ Polyamide 6I/6T | Polyamide 6 | Polyamide 6 | Polyamide 6 | Polyamide 666 |
| | | (D) Melting point | °C. | 195 | 213 | 225 | 225 | 225 | 225 | 195 |
| | | Amount | Parts by mass | 100 | 50/50 | 100 | 100 | 100 | 100 | 100 |
| | Nucleating agent | Type | | Talc | Talc | Talc | Talc | Talc | Talc | — |
| | | Amount | Parts by mass | 0.8 | 0.8 | 0.8 | 0.8 | 0.8 | 0.8 | — |
| | Stabilizer | Type | | — | — | Hindered phenol antioxidant | — | — | — | — |
| | | Amount | Parts by mass | — | — | 0.3 | — | — | — | — |
| | Foaming agent | Type | | Air | Air | Air | Air | Methanol | Air | — |
| | (E) Thermal fusion temperature | | °C. | 113 | 140 | 140 | 140 | 140 | 140 | — |
| Evaluation of foam shaped product | (1) Heat resistance evaluation (160° C.) | (1-1) Rate of dimensional change | % | Not measured | — | — | — | — | — | Not measured |
| | | (1-2) Change in external appearance | — | Not measured | — | — | — | — | — | Not measured |
| | (1) Heat resistance evaluation (180° C.) | (1-1) Rate of dimensional change | % | Not measured | 2.1 | 0.7 | 1.2 | 23 | 1.8 | Not measured |
| | | (1-2) Change in external appearance | — | Not measured | Satisfictory | Good | Poor | Poor | Poor | Not measured |
| | (2) Bending strength | | MPa | Not measured | 1.8 | 3.6 | 2.6 | 1.7 | 0.8 | Not measured |
| | (3) Fusion rate | | % | Not measured | 74 | 87 | 75 | 54 | 12 | Not measured |
| | (4) External appearance | | — | Not measured | Satisfactory | Good | Good | Satisfactory | Poor | Not measured |
| | (5) Sound insulation evaluation | | — | Good | Not measured | Not measured | Not measured | Not measured | Not measured | Poor |

INDUSTRIAL APPLICABILITY

This disclosure enables the industrial provision of a polyamide resin foam shaped product having a high crystallinity, large crystallite size, and excellent heat resistance and sound insulation.

The disclosed polyamide resin foam shaped product can be suitably adopted for an insulting material, automotive component (for example, an oil pan, a cover-shaped component such as an engine cover or cylinder head cover, an intake manifold, an integrated component thereof, a body structure, a duct, an electrical equipment case, or a battery case), or the like used under high-temperature conditions, such as to exploit the features of the disclosed polyimide resin foam shaped product.

The invention claimed is:

1. A polyamide resin foam shaped product comprising a polyamide resin, wherein
the polyamide resin foam shaped product has a crystallinity X of 10% to 50% and a crystallite size D of 10 nm or more as calculated based on a peak having a smallest peak width in an X-ray diffraction profile of the polyamide resin foam shaped product.

2. The polyamide resin foam shaped product according to claim 1, having a density of 50 kg/m$^3$ to 500 kg/m$^3$.

3. The polyamide resin foam shaped product according to claim 1, having a closed cell ratio S of 80% or more.

4. The polyamide resin foam shaped product according to claim 1, wherein
the polyamide resin has a melting point of no lower than 150° C. and no higher than 270° C. as measured by differential scanning calorimetry.

5. The polyamide resin foam shaped product according to claim 1, formed from polyamide resin pre-expanded particles containing the polyamide resin.

6. The polyamide resin foam shaped product according to claim 1, wherein the polyamide resin includes an aliphatic polyamide resin in an amount of greater than 50 mass %.

7. The polyamide resin foam shaped product according to claim 1, having a fusion rate of 60% or more.

8. A method of producing the polyamide resin foam shaped product according to claim 1, comprising:
a preceding process of loading the polyamide resin pre-expanded particles into a cavity of a mold, supplying steam into the cavity for 5 seconds to 30 seconds with a temperature of no higher than a thermal fusion temperature of the polyamide resin pre-expanded particles, and pre-heating the polyamide resin pre-expanded particles; and
a subsequent process of supplying steam into the cavity for 20 seconds to 120 seconds with a temperature of no lower than the thermal fusion temperature of the polyamide resin pre-expanded particles, and foaming and thermally fusing the polyamide resin pre-expanded particles to obtain a polyamide resin foam shaped product.

* * * * *